(12) United States Patent
Binhussain et al.

(10) Patent No.: US 10,633,290 B2
(45) Date of Patent: Apr. 28, 2020

(54) HIGH STRENGTH TRANSPARENT CERAMIC USING CORUNDUM POWDER AND METHODS OF MANUFACTURE

(71) Applicants: King Abdulaziz City for Science and Technology, Riyadh (SA); Fraunhofer-Gesellschaft, München (DE)

(72) Inventors: Mohammed A. Binhussain, Riyadh (SA); Akeel Khalid Alakeel, Riyadh (SA); Majid Mohammed Binmajid, Riyadh (SA); Jens Klimke, Dresden (DE)

(73) Assignees: King Abdulaziz City for Science and Technology, Riyadh (SA); Fraunhofer-Gesellschaft, Munich (DE)

( * ) Notice: Subject to any disclaimer, the term of this patent is extended or adjusted under 35 U.S.C. 154(b) by 0 days.

(21) Appl. No.: 14/851,827

(22) Filed: Sep. 11, 2015

(65) Prior Publication Data

US 2016/0060131 A1    Mar. 3, 2016

Related U.S. Application Data

(62) Division of application No. 14/470,281, filed on Aug. 27, 2014, now Pat. No. 9,527,774.

(51) Int. Cl.
  *C04B 35/115*  (2006.01)
  *C04B 35/626*  (2006.01)
  *C04B 35/645*  (2006.01)
  *C01F 7/02*   (2006.01)

(52) U.S. Cl.
  CPC ............. *C04B 35/115* (2013.01); *C01F 7/02* (2013.01); *C04B 35/6261* (2013.01); *C04B 35/62625* (2013.01); *C04B 35/6455* (2013.01); *C01P 2006/12* (2013.01); *C01P 2006/32* (2013.01); *C01P 2006/60* (2013.01); *C01P 2006/90* (2013.01); *C04B 2235/3206* (2013.01); *C04B 2235/3241* (2013.01); *C04B 2235/3275* (2013.01); *C04B 2235/5409* (2013.01); *C04B 2235/6023* (2013.01); *C04B 2235/616* (2013.01); *C04B 2235/6562* (2013.01); *C04B 2235/6585* (2013.01); *C04B 2235/661* (2013.01); *C04B 2235/96* (2013.01); *C04B 2235/9607* (2013.01); *C04B 2235/9661* (2013.01)

(58) Field of Classification Search
  CPC .................................................... C04B 35/115
  See application file for complete search history.

(56) References Cited

U.S. PATENT DOCUMENTS 4,799,601  A   1/1989   Shimai et al.
6,306,788  B1  10/2001  Watanabe et al.
6,417,127  B1 *  7/2002  Yamamoto ............ C04B 35/115
                                                          501/127
7,247,589  B2 *  7/2007  Krell .................... B82Y 30/00
                                                          501/103
7,396,792  B2 *  7/2008  Van Bruggen ........ C04B 35/115
                                                          313/636
7,888,279  B2 *  2/2011  Tsukuma ............ A61C 13/0003
                                                          433/8
8,158,035  B2   4/2012   Sakaguchi et al.
8,278,233  B2   10/2012  Miyazawa et al.
8,481,439  B2   7/2013   Yamashita et al.
2002/0171363 A1  11/2002  Scott et al.
2003/0209541 A1  11/2003  Cheng et al.
2005/0164867 A1  7/2005   Krell et al.
2005/0248277 A1  11/2005  Van Bruggen et al.
2011/0039685 A1  2/2011   Mao et al.
2011/0189622 A1 *  8/2011  Yamashita ............ A61L 27/105
                                                          433/8

FOREIGN PATENT DOCUMENTS

CN    101306943 A    11/2008
EP       1706365 B1  10/2006
JP    2008137838 A    6/2008
SE     200303403 A   12/2003
WO    2005068392     7/2005

OTHER PUBLICATIONS

Office Action dated Oct. 30, 2015 in related U.S. Appl. No. 14/470,281, 12 pages.
Office Action dated Mar. 28, 2016 in related U.S. Appl. No. 14/470,281, 11 pages.
Aman et al., "Influence of green state processes . . . spark plasma sintered alumina", Journal of the European Ceramic Society, vol. 29, Issue 16, Dec. 15, 2009, abstract.
Lallemant et al., "Transparent polycrystalline alumina obtained by SPS: Green bodies processing effect", Journal of the European Ceramic Society 32, 2012, pp. 2909-2915.
Krell et al., "Effect of the Homogeneity of Particle Coordination . . . of transparent Alumina", Journal of the American Ceramic Society 89, 2006, pp. 1985-1992.
Apetz et al., "Transparent Alumina: A light-Scattering Model", Journal of the American Ceramic Society, vol. 86, Mar. 2003, pp. 480-486.
Brandes et al., "Gel Casting of Free-Shapeable . . . Pore Size for Ultra- and Microfiltration", Journal of the American Ceramic Society, vol. 97, 2014, No. 5, pp. 1393-1401.

(Continued)

*Primary Examiner* — Karl E Group
(74) *Attorney, Agent, or Firm* — Andrew M. Calderon; Roberts Calderon Safran & Cole, P.C.

(57) ABSTRACT

High strength transparent corundum ceramics using corundum powder and methods of manufacture are disclosed. The method of forming transparent corundum ceramics includes milling corundum powder in aqueous slurry with beads. The method further includes processing the slurry by a liquid shaping process to form a gelled body. The method further includes sintering the gelled body in air and pressing the gelled body by hot isostatic pressing to form a ceramic body.

15 Claims, 3 Drawing Sheets

(56) References Cited

OTHER PUBLICATIONS

Petit et al., "Sintering of a-alumina for highly transparent ceramic applications", Journal of the European Ceramic Society, vol. 31, 2011, pp. 1957-1963.
Bernard-Granger et al., "Influence of Co-Doping . . . of a submicronic alumina material", Journal of the American Ceramic Society, vol. 91, No. 5, 2008, pp. 1703-1706.
Roussel et al., "Highly dense, Transparent . . . Nanoparticles Via a Standard SPS Sintering", Journal of the American Ceramic Society, vol. 96, No. 4, 2013, pp. 1039-1042.
Kim et al., "Microstructure and optical properties of transparent alumina", Acta Materialia, vol. 57, 2009, pp. 1319-1326.
Janney et al., "Development of Low-Toxicity Gelcasting Systems", Journal of the American Ceramic Society, vol. 81, No. 3, 1998, pp. 581-591.
Grasso et al., "Highly transparent a-alumina obtained by low cost high pressure SPS", Ceramics International, vol. 39, 2013, pp. 3243-3248.
Suárez et al., "Sintering to Transparency of Polycrystalline Ceramic Materials" Sintering to Transparency of Polycrystalline Ceramic Materials, Mar. 2012, pp. 527-552.
Krell, et al., "Transparent Sintered Corundum with High Hardness and Strength", Journal of the American Ceramic Society 86, Issue 1, Dec. 20, 2004, abstract.
Krell, et al., "Transparent Sintered sub-µm Al2O3 with Infrared Transmissivity Equal to Sapphire", Window and Dome Technologies VIII, Sep. 25, 2003, abstract.
Notice of Allowance related for U.S. Appl. No. 14/470,281, dated Oct. 18, 2016, 9 pages.
Krell et al., "Transparent sintered corundum with high hardness and strength", Journal of the American Ceramic Society, Blackwell Publishing, Malden, MA, US, vol. 86, No. 1, Jan. 1, 2003, pp. 12-18, 7 pages.
Krell et al., "Advanced spinel and sub-µm Al2O3 for transparent armour applications", Journal of the European Ceramic Society, Elsevier Science Publisher, Barking, Essex, GB, vol. 29, No. 2, Jan. 1, 2009, pp. 275-281, 7 pages.
Krell et al., "Transmission physics and consequences for materials selection, manufacturing, and applications", Journal of the European Ceramic Society, Elsevier Science Publisher, Barking, Essex, GB, vol. 29, No. 2, Jan. 1, 2009, pp. 207-221, 15 pages.

* cited by examiner

HIGH STRENGTH TRANSPARENT CERAMIC USING CORUNDUM POWDER AND METHODS OF MANUFACTURE

FIELD OF THE INVENTION

The invention relates to corundum ceramics using corundum powder and, more particularly, to high strength transparent corundum ceramics using corundum powder and methods of manufacture.

BACKGROUND OF THE INVENTION

Ceramics are very versatile in their industrial use ranging from applications in engine components, frames, etc. The properties of ceramic materials are based on many factors including, for example, the types of atoms, the bonding between the atoms, and the packaging of the atoms. For example, ceramics usually have a combination of ionic and covalent bonds. The covalent bond typically results in high elastic modulus and hardness, high melting points, low thermal expansion, and good chemical resistance.

More specifically, due to ceramic materials wide range of properties, they can exhibit the following characteristics: (i) hard, (ii) wear-resistant, (iii) brittle, (iv) refractory, (v) thermal and electrical insulators, (v) nonmagnetic, (vi) oxidation resistant, (vii) prone to thermal shock, and (viii) chemically stable. Ceramics are thus known to have excellent optical, mechanical, thermal, and chemical properties. In fact, polycrystalline ceramics exhibit extraordinary properties that cannot be reached by glasses due to its high strength. It is a combination of these properties that make ceramics very versatile in their industrial use.

SUMMARY OF THE INVENTION

In an aspect of the invention, a method of forming transparent corundum ceramics comprises milling corundum powder in aqueous slurry with beads. The method further comprises processing the slurry by a liquid shaping process to form a gelled body. The method further comprises sintering the gelled body in air and pressing the gelled body by hot isostatic pressing to form a ceramic body.

In an aspect of the invention, a method comprises: milling corundum powder with BET of 15-24 m²/g in an aqueous slurry with corundum beads; processing the aqueous slurry by a liquid shaping process to form a gelled body; sintering the gelled body in air at a temperature between 1150° C.-1170° C.; and pressing the gelled body by hot isostatic pressing in Argon at temperatures between 1100° C.-1150° C. to form a ceramic body.

In an aspect of the invention, a corundum ceramic body composed of corundum powder comprises the following properties: a hardness HV10>2000; a 4 pt.-bending strength>600 MPa; an in-line transparency is 66.0% at 640 nm wavelength at thickness of 0.8 mm with polished surfaces; a total forward transmission>80% at 640 nm wavelength at the thickness of 0.8 mm with polished surfaces; and a thermoconductivity at room temperature of 27 W/mK.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to corundum ceramics using corundum powder and, more particularly, to high strength transparent corundum ceramics using corundum powder and methods of manufacture. In more specific embodiments, the present invention is directed to transparent corundum ceramics with homogeneous inline transmission defined by a difference of inline transmission measurement at any point in an area of 20×20 mm² less than 1%. Advantageously, the present invention can be used in many different applications ranging from aircraft and automobile materials to use in building industries and medical applications.

In an exemplary embodiment of the present invention, the corundum ceramics of the present invention can be manufactured, for example, using the following processes:

(i) using corundum powder with BET of 17-21 m²/g;
(ii) milling the powder in an aqueous slurry with corundum beads;
(iii) processing the slurry by a liquid shaping process to form a gelled body;
(iv) sintering the gelled body in air at a temperature between 1150° C.-1170° C.; and
(v) followed by hot isostatic pressing in Argon at temperatures between 1100° C.-1150° C. to form the ceramic body. In embodiments, the hot isostatic pressing can also be in nitrogen or oxygen at about 1100° C.-1150° C.

In more specific embodiments, the method for production of transparent corundum ceramics includes the use of corundum powder with a BET of 17-21 m2/g; however, the present invention also contemplates other ranges. For example, the corundum powder can have a BET of 15-24 m²/g. In embodiments, the raw powder can be obtained from Taimei Chemicals Co., LTD., Japan, under the trade name of TM-UF. The measurements, e.g., BET of 15-24 m²/g, can be made with an ASAP2020 Physisorption Analyzer, Micromeritics, Norcross, Ga.

Figure 1:
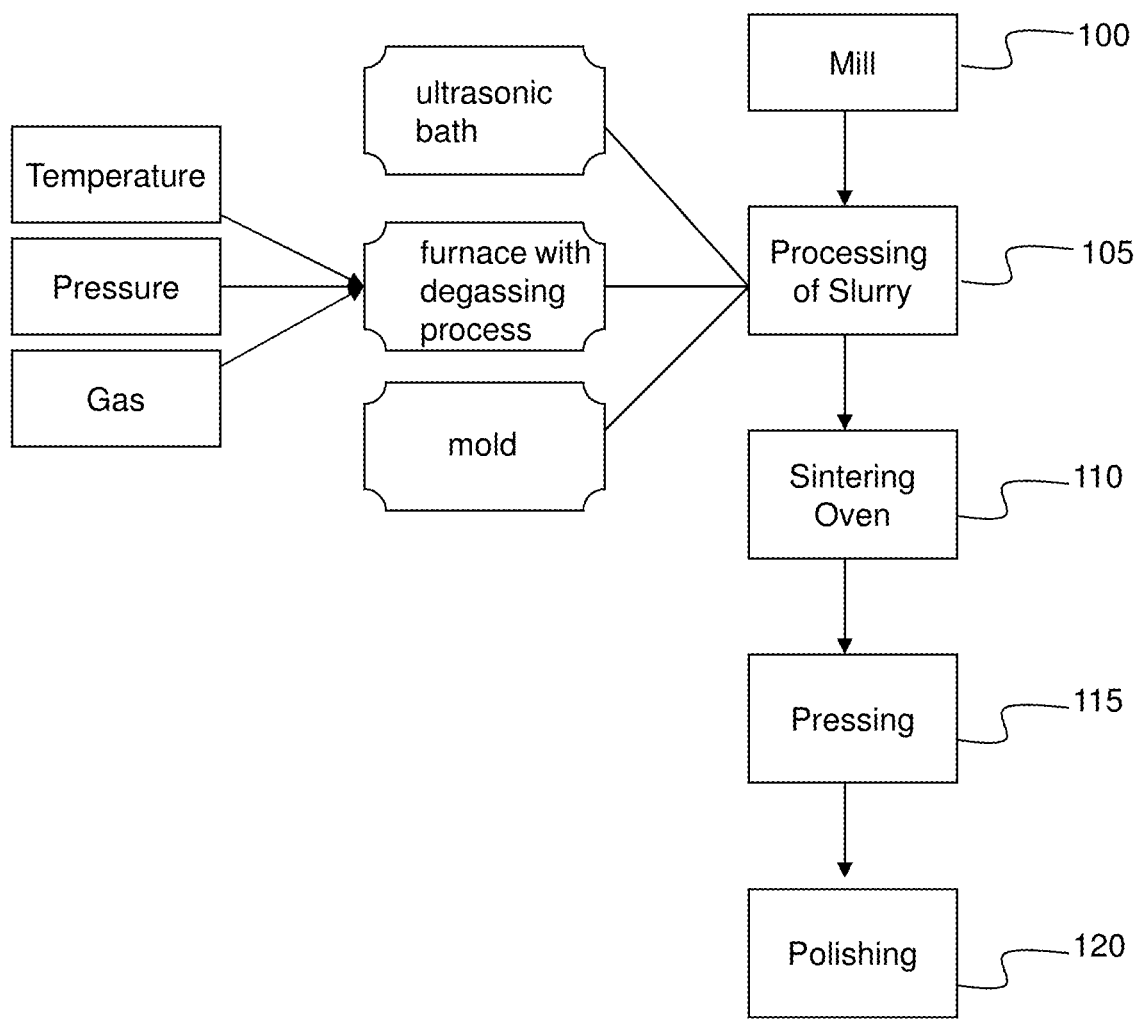
FIG. 1 is representative of a processing flow and related equipment used in accordance with aspects of the present invention.

FIG. 1 is representative of a processing flow and related equipment used in accordance with aspects of the present invention. As shown in FIG. 1, the corundum powder can be milled in aqueous slurry with corundum beads. For example, the milling can be performed by an attrition mill, e.g., attrition milling processes, as shown representatively at reference numeral 100. In alternative embodiments, the milling can be performed by a tumble or ball mill, vertical roller mill or the like, each of which are represented at reference numeral 100.

In embodiments, the composition of the aqueous slurry comprises distilled water, with HNO₃ for stabilizing the pH of the corundum powder. In embodiments, the pH should be about 4. In embodiments, $HNO_3$ can be a stabilisator for the repulsion of the corundum particles. $HNO_3$ is easily decomposable or other acids or steric stabilization with organics like DOLAPIX or DISPEX. DOLAPIX is an alkali-free anionic polyelectrolyte (Dolapix CE64) dispersant which is delivered as a 70 wt % aqueous solution and contained 30 wt % of the ammonium salt of polymethacrylic acid (PMAA-NH4). Dispex is a polyacrylate dispersant which is used to disperse inorganic materials. (DOLAPIX is a trademark of DuPont.) A sintering aid, e.g., additive such as, for example, MgO, MgO precursors. $Y_2O_3$, $La_2O_3$, or TiO2, can be added to promote densification during sintering.

In one example, the corundum beads can be about 2 mm in diameter; although other sized corundum beads are also contemplated by the present invention. For example, the diameter of the corundum beads can range from about 0.5 mm to about 4 mm. In preferred embodiments, the corundum beads are dense sintered corundum beads with sub-µm grain size. In further embodiments, 800 grams of milling beads can be used for 300 gram of powder; although it should be understood that other amounts and types of milling beads can be used in the present invention, without limitation to the above example. In embodiments, for example, the amount of milling beads can be dependent on the volume and type of mill. For example, the relation of powder to beads can be between 1:2 and 1:4.

In embodiments, the processing of the slurry can include a liquid shaping process. In embodiments, the processing of the slurry can be performed by a liquid shaping process for about 2 hours in duration. The processing can include different processing techniques as shown representatively at reference numeral 105 of FIG. 1. For example, the corundum powder, e.g., TM-UF raw powder, can be added to the slurry in an ultrasonic bath for 30 minutes, then the slurry can be added to 800 grams of corundum milling beads with particle size 1-2 mm, for about two hours in an attrition mill at 1000 rpm.

The liquid shaping process can be one of many different ceramic forming techniques, any of which is shown representatively at reference numeral 105 of FIG. 1. In embodiments, the shaping process can be used for producing advanced, high-temperature structural parts such as engine components and the like from powders of ceramic raw materials. For example, the present invention contemplates a gelcasting process as shown at reference numeral 105; although other liquid shaping techniques are contemplated by the present invention, e.g., "slip casting" or "coagulation casting" each of which are also represented at reference numeral 105.

As should be understood by those of skill in the art, gelcasting is a colloidal processing method with a short forming time, high yields, and low-cost machining, used to prepare high-quality and complex-shaped dense/porous ceramic parts. On the other hand, the present invention also contemplates slipcasting techniques. Slipcasting techniques are known to provide a superior surface quality, and to achieve a higher density and uniformity in casting high-purity ceramic raw materials over other ceramic casting techniques, such as hydraulic casting.

In more specific embodiments, the liquid shaping process of the present invention can be performed with the following tools: ultrasonic bath, furnace with degassing process and a mold (glass mold) as shown representatively at reference numeral 105. In embodiments, the degassing process starts with placing slurry molds (of any shape or dimension, depending on the characteristics of the final product) in a vacuum furnace at about 20-25° C. (e.g., room temperature) with vacuuming the air inside the furnace until it reaches about 200 mbar. In embodiments, the vacuuming of the air inside can be provided until it reaches a vacuum near the boiling point of the slurry. The boiling point for pure water is between 23.4 mbar at 20° C. and 31.7 mbar at 25° C. For the slurry the boiling point can be determined experimentally by reducing the vacuum to the point when the first bubbles appear. Then, nitrogen gas is inserted into the furnace until the furnace reaches atmospheric pressure, e.g., about 1000 mbar which is slightly below the standard atmospheric pressure of 1013.25 mbar, which depends on the altitude above the sea level and weather. Thereafter, the nitrogen gas is vacuumed until it reaches about 200 mbar. In embodiments, the vacuuming of the nitrogen inside can be provided until it reaches a vacuum near the boiling point of the slurry. The process of inserting nitrogen gas and vacuuming can be repeated two times, preferably. After waiting for about 20-40 minutes at 200 mbar, the furnace is again filled with nitrogen gas. The temperature is then increased for the vacuum furnace to about 40° C. to 80° C. and preferably about 60° C. for about 0.5 to 8.0 hours, with a preference of about 4.0 hours. Afterwards, the furnace is reduced to room temperature (e.g., 20° C. to 25° C.)

In embodiments, the shaping process results in a gelled body (formed from the mold) which is dried. The gelled body can be infiltrated with one or more precursors of metal ions solved in water to form colored transparent ceramics. After drying, organics are burnt out at about 800° C., and the body is sintered in air (using a sintering oven as shown representatively at reference numeral 110 of FIG. 1) and hot isostatic pressed in argon (using a press as shown representatively at reference numeral 115 of FIG. 1). The gelled body or the dried body or the porous body can be infiltrated with solutions of salts like Cobalt(II) nitrate, Chromium(III) nitrate or Nickel(II) nitrate to form colored ceramics.

In embodiments, the ceramic body can be dried in air for around 1-14 days, in order to remove any aqueous solution therefrom. For example, in embodiments, the gelled body can be sintered in air at a temperature between 1150° C.-1170° C. to form a ceramic body, as represented by reference numeral 110 of FIG. 1. In more preferred embodiments, sintering can be performed, e.g., 5 K/min. (and even 1 K/min. to 10 K/min.) to 950° C. and 2K/min. to final temperature. In further embodiments, the sintering can be, e.g., 1-10K/min. to final temperature, with a hold time of about 0 minutes to about 10 hours, with a cool down with 1-50 K/min. It should be understood that other temperatures can also be used for sintering the ceramic body. In embodiments, the sintering is performed in air.

In further embodiments, the hot isostatic pressing can be performed in Argon, Nitrogen or Oxygen at temperatures between 1100° C.-1150° C. In embodiments, the hot isostatic pressing subjects the body to both elevated temperature and isostatic gas pressure in a high pressure containment vessel as represented by reference numeral 115. In embodiments, the chamber is heated, causing the pressure inside the vessel to increase. Pressure is applied to the material from all directions (hence the term "isostatic"). When castings are treated with hot isostatic pressing, the simultaneous application of heat and pressure eliminates internal voids and microporosity through a combination of plastic deformation, creep, and diffusion bonding. Also, the hot isostatic pressing will increase the density of the ceramic material, improving its mechanical properties and workability.

In embodiments, the pressing includes, e.g., heating with 2-5 K/min, with a pressure increase during heating, as representatively shown by reference numeral 120. In preferred embodiments, the pressing occurs for about 8 to 15 hours at final temperature, e.g., 1100° C.-1150° C. under the final pressure. For example, the preferred pressure is about 200 MPa, with a range contemplated by the present invention of about 50 MPa to 200 MPa.

In embodiments, the resultant ceramic body can have a thickness of about 0.3 cm to 2.0 cm; although other dimensions are contemplated by the present invention. By way of example, the present invention contemplates any shape with wall thickness between 0.5 cm to 3.0 cm, including hollow bodies and complex structures. In embodiments, the length and width of the ceramic body are only limited by the size of the mold and the size of the furnace. Also, by way of illustrative example, the final composition of the ceramic body is greater than 99% Corundum. In embodiments, the ceramic body can include dopants, e.g., $Mg^{2+}$, $Cr^{3+}$, $Ni^{2+}$, and/or $Co^{2+}$.

In embodiments, the processes of the present invention result in transparent corundum ceramics with homogeneous inline transmission defined by a difference of inline transmission measurement on polished surfaces or surfaces covered with liquid of same index of refraction at any point in an area of 20×20 $mm^2$ less than 1%. As should be understood by those of skill in the art, homogenous inline transmission is provided by measurement, which can be performed with a light transmission meter LCRT2006, from Gigahertz Optik GmbH, Türkenheim, Germany, at wavelength of about 640 nm and with defined aperture of 0.57° and a diameter of the measurement area of 5 $mm^2$. It should be noted, though, that any spectrometer with similar small aperture and a measurement spot≤5 mm is well suited for the present invention. It should also be noted that less than 1% is related to the difference of the results of measurements at different points of the area, with the size of the area can be defined larger, e.g., 100 $mm^2$×100 $mm^2$ or 50 $mm^2$×50 $mm^2$.

Once the processes are completed, the final properties of the ceramic body can include, e.g.:

(i) Hardness HV10>2000, 4 pt.-bending strength>600 MPa;

(ii) In-line transparency is 43.8% for a 460 nm wavelength at a thickness of 1.0 mm and the in-line transparency is 66.0% for a 640 nm wavelength at a thickness of 0.8 mm with polished surfaces and total forward transmission>80% at 460-640 nm wavelength;

(iii) For colored ceramics, the transparency can be lower by specific absorption from metal ions like $Co^{2+}$, $Cr^{3+}$, $Ni^{2+}$ incorporated into the ceramics; and (iv) Thermoconductivity at room temperature (e.g., 20-25° C.) of 24-28 W/mK.

In additional contemplated embodiments, the in line transmission of the transparent corundum can differ with different thickness and wavelength. By way of example, Table 1 shows in line transmission of the transparent corundum with different thickness and wavelength. As shown in Table 1, the transmission increases with higher wavelength and lower thickness.

TABLE 1

| Wavelength/<br>thickness (mm) | 0.4 mm | 0.6 mm | 0.8 mm | 1.0 mm |
| --- | --- | --- | --- | --- |
| 800 nm | 79.2 | 76.1 | 73.0 | 70.1 |
| 640 nm | 75.3 | 70.5 | 66.0 | 61.8 |
| 460 nm | 65.6 | 57.3 | 50.1 | 43.8 |

Figure 2:
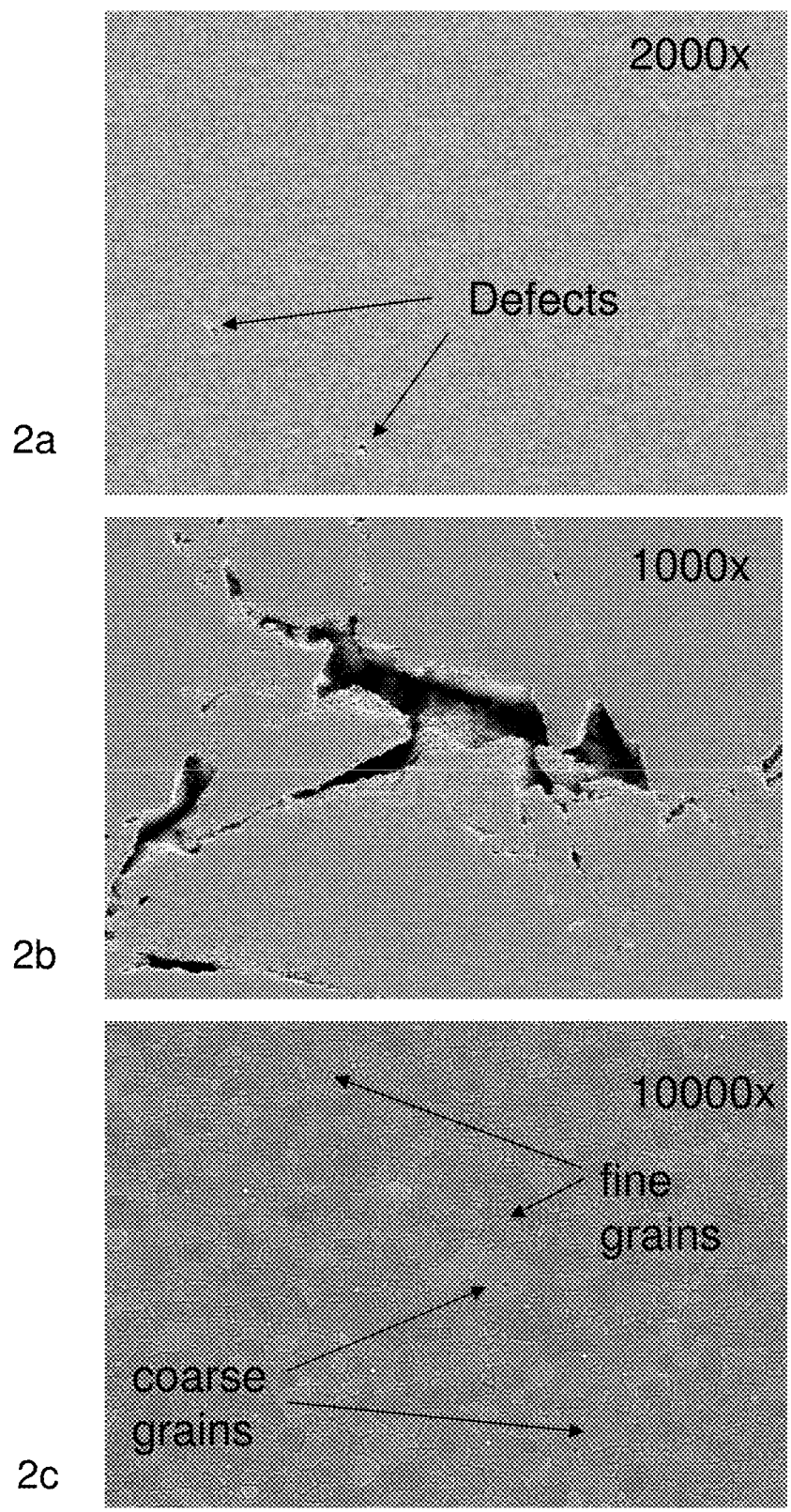
FIG. 2a shows a cross sectional view (SEM micrograph with magnification 2000×) of the microstructure at the inner part of a transparent corundum ceramics using corundum powder with small defects (pores).
FIG. 2b shows a cross sectional view (magnification 1,000×) at the edge of the same sample with large defects.
FIG. 2c shows a SEM micrograph (magnification 10,000×) of a high strength transparent corundum ceramics with inhomogeneous grain size distribution.

FIG. 2a shows a cross sectional view (SEM micrograph with magnification 2000×) of the microstructure at the inner part of a transparent corundum ceramics using corundum powder with small defects (pores). FIG. 2b shows a cross sectional view (magnification 1000×) at the edge of the same sample with large defects. More specifically, FIGS. 2a and 2b show microstructures made by field emission electron scanning microscopy of non-homogeneous (inhomogeneous) high strength transparent corundum ceramic prepared with high purity corundum powder with BET~14 $m^2/g$. Inhomogeneity can be represented by small defects or pores (see, e.g., FIG. 2a) and larger defects (see, e.g., FIG. 2b). Normally the distribution of such defects is irregular, i.e., see FIG. 2a shows a segment from the middle of a sample and FIG. 2b shows a segment of the edge of the same sample. At higher magnification the microstructure between the defects can look homogeneous; however such defects are limit not only to transmission but also the homogeneity of the transmission measured at different points of the sample.

FIG. 2c, on the other hand, shows a corundum microstructure which is free of defects but with inhomogeneous grain size distribution consisting of finer grains and coarser grains. The inline transmission of dense sintered corundum ceramics increase with decrease of grain size. For high inline transmission grain size<1 μm is required and grain size<500 nm is preferred. Inhomogeneous grain size distribution therefore results in inhomogeneous inline transmission. The purpose of the present invention is to provide a transparent corundum ceramics with fine grain size realized by low sintering temperature and a homogeneous inline transmission realized by a defect free microstructure with homogeneous grain size distribution. In embodiments, the sintering temperature should be high enough for full densification but as low as possible to prevent further grain growth as described herein. Fine grain size of the ceramics after sintering only can be realized with fine grain size of the ceramic powder.

It is known that sinter ability of nano corundum powders get worse with finer particle size (respectively higher BET) of the powder because the negative influences of the surface in relation to the volume of the powder becomes much larger. Especially for liquid shaping processes, the electrostatic or steric stabilization of the surfaces of the particles cause a larger distance of the particles with increasing surface area which limits the processability. To overcome the larger distance of the particles higher sintering temperatures are required. Finer particles also form stronger agglomerates which require higher sintering temperatures. Surprisingly, though, it was discovered that high purity corundum powder with BET 15-25 m2/g can be processed with a liquid shaping process at lower sintering temperatures compared with a powder of BET~14 m2/g. Furthermore it was unexpectedly discovered that the dense sintered ceramics showed a much narrower grain size distribution resulting in a homogeneous inline transmission. Furthermore it was discovered that the dense sintered ceramics manufactured in accordance with the present invention, e.g., with the liquid shaping process using powder with BET 15-25 m2/g, was free of defects>150 nm over a range of several centimeters resulting a homogeneous inline transmission.

It should be understood that high transmission demands low grain sizes which can be realized with low sintering temperature. (The sintering temperature and high pressure of the present invention are not known in the literature, by the inventors.) The reasons that the present invention can achieve its advantages and final product are attributable to the specific powder characterized by specific BET and the specific processing with deagglomeration and liquid shaping. On the other hand, the literature notes a specific sintering process called SPS (spark plasma sintering) or field assisted sintering (FAST) but with SPS the homogeneity of the samples is poor because of thermal gradients in the equipment during sintering.

Figure 3:
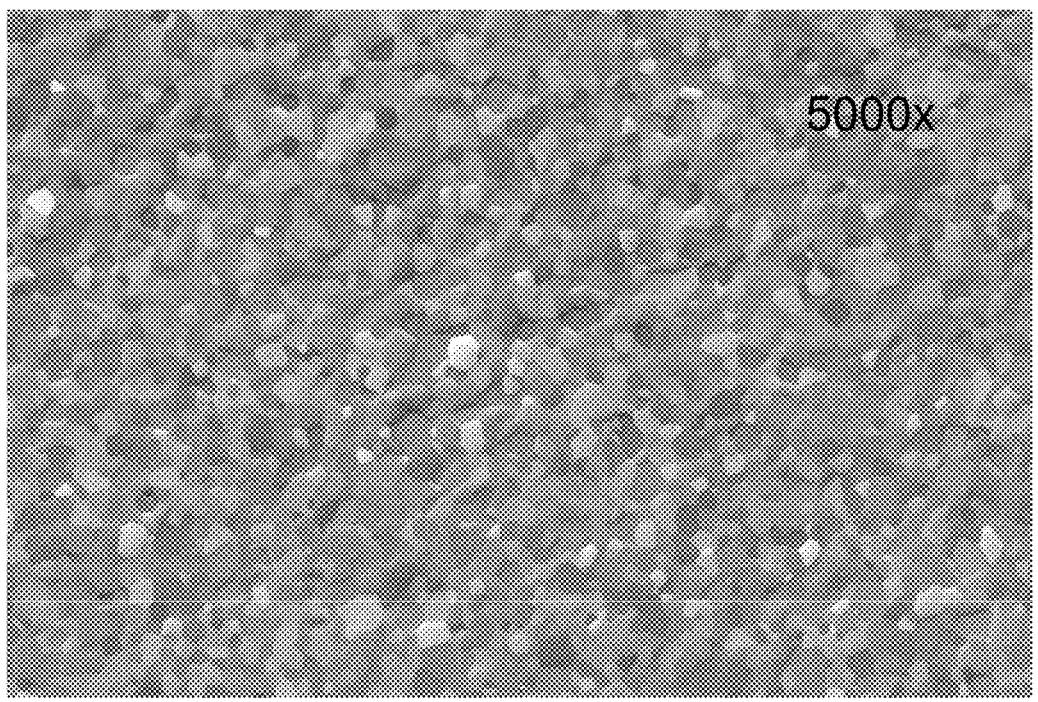
FIG. 3 shows a defect free microstructure (magnification 5000×) with homogeneous grain size distribution according to the present invention.

FIG. 3 shows a cross sectional view of the high strength transparent corundum ceramics using corundum powder in accordance with aspects of the present invention. As shown in this cross sectional view, the high strength transparent corundum ceramics of the present invention exhibit the above noted homogeneous grain size distribution with fine grain size.

Table 2, below, shows many of the properties/characteristics of the corundum ceramic body in accordance with the present invention.

TABLE 2

| CHARACTERISTICS OF CERAMIC BODY | |
| --- | --- |
| Purity | >99% |
| Thickness | 0.3-2.0 cm |
| Transparency | yes |
| Porous | no |
| Coloration | possible |
| High Hardness, High Bending Strength and Thermoconductivity | yes |
| Powder With Specific BET | yes |
| Deagglomeration | yes |
| Infiltration | possible |

The following are example processes in accordance with different aspects of the present invention. It should be understood that any of the processes provided below are contemplated by the present invention and that the above description is thus not considered limiting to the present invention.

Example 1

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m$^3$ was added. An MgO precursor which forms 0.03 wt % MgO after thermal treatment was also added to the slurry. The slurry was milled with 800 grams of corundum milling beads with purity>99.95% and diameter of about 2 mm in an attrition mill for 2 hours at 1000 rpm. After milling, the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and dried. The dried bodies were annealed in air with 0.5 K/min. to 800° C. for 2 hours and sintered in air with 5K/min. to 950° C. and 2K/min. to 1170° C. for 2 hours. The sintered disk was hot isostatically pressed in argon with 5 K/min. to 1150° C. for 15 hours. The transmission after grinding and polishing to a final thickness of about 0.8 mm was measured with a spectrophotometer Varian4000 at five different points of the sample with a shield with diameter 5 mm directly behind the sample. The transmission at wavelength of 640 nm was: 63.07/62.59/62.68/62.59/62.75.

Example 2

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m$^3$ was added. An MgO precursor which forms 0.03 wt % MgO after thermal treatment was also added to the slurry. The slurry was milled with 800 grams of corundum milling beads with purity>99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and dried. The dried bodies were annealed in air with 0.5 K/min. to 800° C. for 2 hours and sintered in air with 5K/min. to 950° C. and 2K/min. to 1160° C. for 2 hours. The sintered disk was hot isostatically pressed in argon with 5 K/min. to 1130° C. for 15 hours. The transmission after grinding and polishing to a final thickness of about 0.8 mm was measured with a spectrophotometer Varian4000 at five different points of the sample with a shield with diameter 5 mm directly behind the sample. The transmission at wavelength of 640 nm was: 63.77/64.18/63.92/63.88/63.56.

Example 3

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m$^3$ was added. The slurry was milled with 800 grams of corundum milling beads with purity>99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and dried. The dried bodies were annealed in air with 0.5 K/min. to 800° C. for 2 hours and sintered in air with 5K/min. to 950° C. and 2K/min. to 1170° C. for 2 hours. The sintered disk was hot isostatically pressed in argon with 5 K/min. to 1150° C. for 15 hours. After polishing and grinding to a final thickness of 2 mm the disk shows a homogeneous in line transmission according to the invention.

Example 4

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m$^3$ was added. An MgO precursor which forms 0.03 wt % MgO after thermal treatment was also added to the slurry. The slurry was milled with 800 grams of corundum milling beads with purity>99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and soaked with 0.1 mol/l solution of chromium (III) nitrate in water for 4 hours. After drying the bodies were annealed in air with 0.5 K/min. to 800° C. for 2 hours and sintered in air with 5K/min. to 950° C. and 2K/min. to 1170° C. for 2 hours. The sintered disk was hot isostatically pressed in argon with 5 K/min. to 1140° C. for 15 hours. After polishing and grinding to a final thickness of 2 mm the disk shows a homogeneous in line transmission according to the invention.

Example 5

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m³ was added. An MgO precursor which forms 0.03 wt % MgO after thermal treatment was also added to the slurry. The slurry was milled with 800 grams of corundum milling beads with purity>99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and soaked with 0.05 mol/l solution of cobalt (II) nitrate in water for 4 h. After drying the bodies were annealed in air with 0.5 K/min. to 800° C. for 2 hours and sintered in air with 5K/min. to 950° C. and 2K/min. to 1160° C. for 2 hours. The sintered disk was hot isostatically pressed in argon with 5 K/min. to 1140° C. for 15 hours. After polishing and grinding to a final thickness of 2 mm the disk shows a homogeneous in line transmission according to the invention.

Example 6

95.0 g of distilled water in a beaker were placed in an ultrasonic bath at pH 4. The pH was adjusted with $HNO_3$. Then 300 g corundum raw powder with purity 99.995% and specific surface area BET of 17.5 g/m³ was added. An MgO precursor which forms 0.03 wt % MgO after thermal treatment was also added to the slurry. The slurry was milled with 800 grams of corundum milling beads with purity>99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and disks with diameter of 25 mm were cut from the rubber-like material and soaked with 0.1 mol/l solution of nickel (II) nitrate in water for 4 h. After drying the bodies were annealed in air with 0.5 K/min. to 800° C. for 2 hours and sintered in air with 5K/min. to 950° C. and 2K/min. to 1160° C. for 2 hours. The sintered disk was hot isostatically pressed in argon with 5 K/min. to 1140° C. for 15 hours; although the present invention also contemplated 1-10 K/min. After polishing and grinding to a final thickness of 2 mm the disk shows a homogeneous in line transmission according to the invention.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A sintered corundum ceramic body composed of corundum powder comprising the following properties:
    a hardness HV10>2000;
    a 4 pt.-bending strength>600 MPa;
    an in-line transparency is 43.8% for a 460 nm wavelength at a thickness of 1.0 mm and the in-line transparency is 66.0% for a 640 nm wavelength at a thickness of 0.8 mm;
    a total forward transmission>80% at 460-640 nm wavelength at a thickness of 0.8-1.0 mm with polished surfaces; and
    a thermoconductivity at room temperature of 24-28 W/mK.

2. The sintered corundum ceramic body composed of corundum powder of claim 1, wherein the transmission increases with higher wavelength and lower thickness.

3. The sintered corundum ceramic body composed of corundum powder of claim 1, wherein the corundum ceramic body is transparent with homogeneous inline transmission defined by a difference of inline transmission measurement at any point in a defined area less than 1%.

4. The sintered corundum ceramic body composed of corundum powder of claim 1, wherein the corundum powder has a BET of 15-24 m2/g.

5. The sintered corundum ceramic body composed of corundum powder of claim 4, wherein the corundum powder has a BET of 17-21 m2/g.

6. The sintered corundum ceramic body composed of corundum powder of claim 1, wherein the sintered corundum ceramic body has a thickness of about 0.3 cm to 2.0 cm.

7. The sintered corundum ceramic body composed of corundum powder of claim 1, wherein the sintered corundum ceramic body has a thickness of between 0.5 cm to 3.0 cm.

8. The sintered corundum ceramic body composed of corundum powder of claim 1, wherein the sintered corundum ceramic body is greater than 99% Corundum.

9. The sintered corundum ceramic body composed of corundum powder of claim 8, wherein the sintered corundum ceramic body includes at least one of the following dopants Mg 2+, Cr3+, Ni2+, and/or Co2+.

10. The sintered corundum ceramic body composed of corundum powder of claim 1, wherein the in-line transparency is 65.6% for the 460 nm wavelength at a thickness of 0.4 mm.

11. The sintered corundum ceramic body composed of corundum powder of claim 10, further comprising an inhomogeneity represented by defects in the corundum powder, wherein the in-line transparency is 70.5% for the 640 nm wavelength at a thickness of 0.6 mm.

12. The sintered corundum ceramic body composed of corundum powder of claim 9, wherein a gelled body that is sintered and pressed to form the corundum ceramic body is infiltrated with a Cobalt (II) nitrate salt.

13. The sintered corundum ceramic body composed of corundum powder of claim 9, wherein a gelled body that is sintered and pressed to form the corundum ceramic body is infiltrated with a Chromium (III) nitrate salt.

14. The sintered corundum ceramic body composed of corundum powder of claim 9, wherein a gelled body that is sintered and pressed to form the corundum ceramic body is infiltrated with a Nickel (II) nitrate salt.

15. The sintered corundum ceramic body composed of corundum powder of claim 14, wherein a distribution of the defects is irregular.

* * * * *